US006973451B2

(12) United States Patent
Laronne et al.

(10) Patent No.: US 6,973,451 B2
(45) Date of Patent: Dec. 6, 2005

(54) MEDIUM CONTENT IDENTIFICATION

(75) Inventors: Shai A. Laronne, Montville, NJ (US); Hiroyuki Shinhai, Kawasaki (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 4 days.

(21) Appl. No.: 10/683,655

(22) Filed: Oct. 10, 2003

(65) Prior Publication Data

US 2005/0050047 A1 Mar. 3, 2005

Related U.S. Application Data

(60) Provisional application No. 60/449,422, filed on Feb. 21, 2003.

(51) Int. Cl.[7] .............................................. G06F 17/30

(52) U.S. Cl. ......................... 707/3; 707/10; 369/53.44; 360/39

(58) Field of Search .......................... 707/2, 3, 10, 102, 707/104.1; 369/53.1, 47.1, 53.2, 53.37, 53.44, 369/53.45, 59.1, 59.25; 360/39

(56) References Cited

U.S. PATENT DOCUMENTS

| | | | | |
|---|---|---|---|---|
| 5,751,672 | A | 5/1998 | Yankowski | |
| 5,956,716 | A * | 9/1999 | Kenner et al. | 707/10 |
| 5,987,525 | A | 11/1999 | Roberts et al. | |
| 6,061,680 | A | 5/2000 | Scherf et al. | |
| 6,154,773 | A | 11/2000 | Roberts et al. | |
| 6,345,256 | B1 * | 2/2002 | Milsted et al. | 705/1 |
| 2002/0133499 | A1 * | 9/2002 | Ward et al. | 707/102 |
| 2002/0161741 | A1 | 10/2002 | Wang et al. | |
| 2003/0028721 | A1 * | 2/2003 | Woodward | 711/112 |
| 2003/0028796 | A1 | 2/2003 | Roberts et al. | |
| 2004/0002935 | A1 * | 1/2004 | Attias | 707/1 |
| 2004/0028281 | A1 * | 2/2004 | Cheng et al. | 382/232 |
| 2004/0034650 | A1 * | 2/2004 | Springer et al. | 707/102 |

FOREIGN PATENT DOCUMENTS

| | | |
|---|---|---|
| EP | 1253529 A1 | 10/2002 |
| JP | 8306124 | 11/1996 |

OTHER PUBLICATIONS

"Allman Concert to go Instantly to CD", The News & Observer, Aug. 4, 2003.

* cited by examiner

*Primary Examiner*—Leslie Wong
(74) *Attorney, Agent, or Firm*—Miller Patent Services; Jerry A. Miller

(57) ABSTRACT

Methods and apparatus for identifying medium content and updating database information. A medium identifier is created from both track fingerprint as well as physical media characteristics. The medium identifier is then used to query either a local or remote database of content information. A non-commercial medium test is conducted and if the medium is determined to be non-commercially created or if the medium is not identified in a database, fingerprints for all tracks are extracted and an extended medium identifier is created to query a database for information on all tracks on the medium.

68 Claims, 7 Drawing Sheets

600

MEDIUM CONTENT IDENTIFICATION

CROSS REFERENCE TO RELATED DOCUMENTS

This application is related to and claims priority to U.S. provisional patent application Ser. No. 60/449,422 filed Feb. 21, 2003, to Laronne entitled "Media Identification Algorithm for Systems That Do Not Give Performance Penalty," and is also related to U.S. Pat. No. 5,751,672 issued May 12, 1998 to Yankowski entitled "Compact Disc Changer Utilizing Disc Database" which is hereby incorporated herein by reference.

BACKGROUND

Much of the existing pre-recorded media used today (e.g., CD, DVD, MiniDisc™, etc.) may not contain Table of Content (TOC) information that can be used to describe the recorded content to a user. Some media may contain incorrect or no descriptive information at all. Therefore, when inserted into a playback device, the medium may not be associated with information descriptive of the pre-recorded content. A user may elect to manually enter information available on the media label, jewel case, or from prior knowledge of the content or the artist. Media identification technologies are designed to automatically identify the medium and provide accurate and descriptive information. Once the media has been identified, data such as album, artist, and track information or metadata such as cover art, artist website universal resource locator, and multimedia content related to the media may be retrieved from remote databases. This information can then be displayed to the user and can enhance usability of the media.

BRIEF DESCRIPTION OF THE DRAWINGS

Certain exemplary embodiments may be best understood by reference to the following detailed description in conjunction with the accompanying drawings in which.

DETAILED DESCRIPTION

Figure 1:
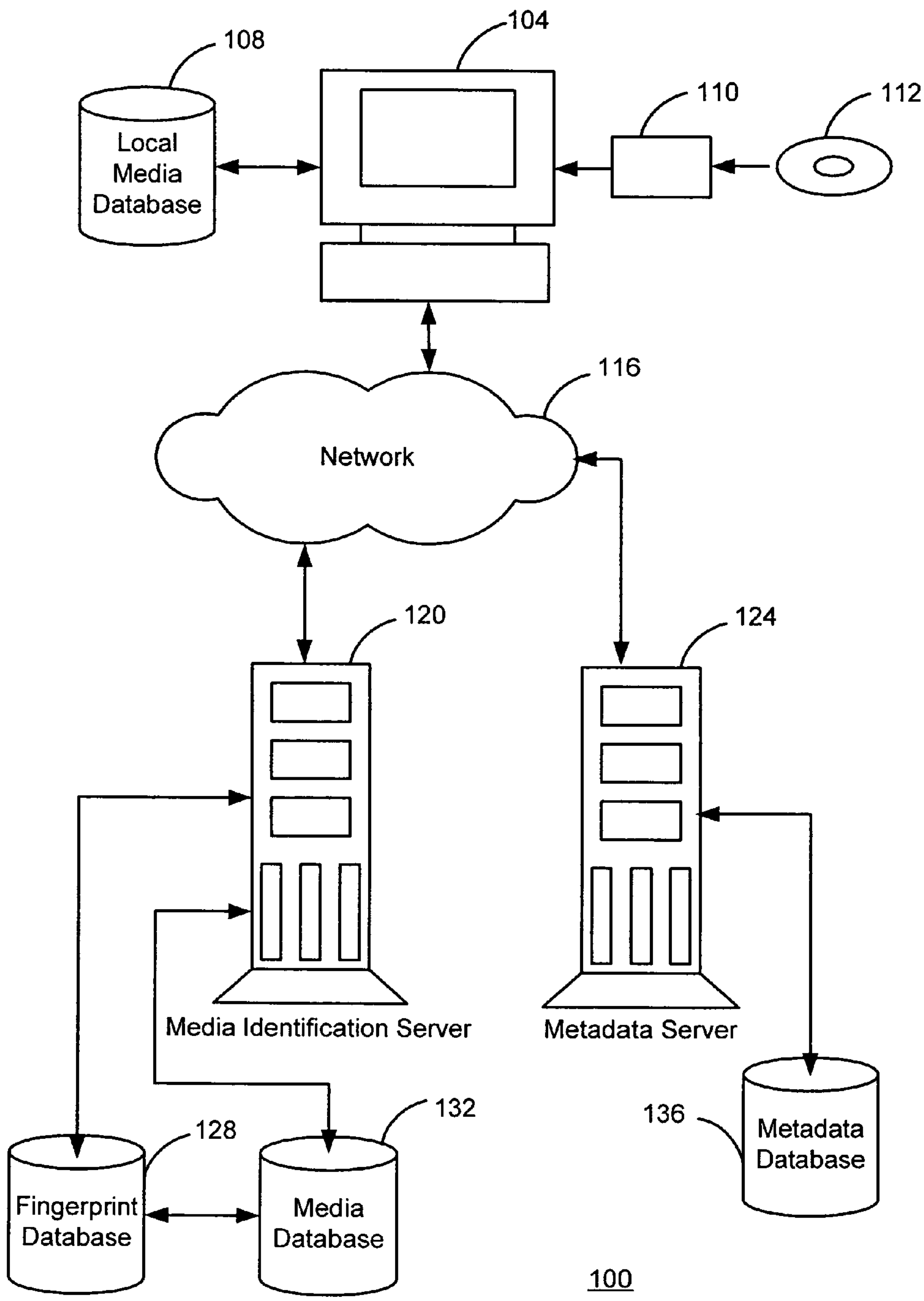
FIG. 1 is an exemplary medium identification system consistent with certain embodiments of the present invention.

There is shown in the drawings and will herein be described in detail specific embodiments, with the understanding that the present disclosure is to be considered as exemplary of certain embodiments and is not intended to limit the invention to the specific embodiments shown and described. In the description below, like reference numerals are used to describe the same, similar, or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including/includes," "containing/contains," and/or "having/has", as used herein, are defined as comprising/comprises (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The Yankowski patent, incorporated herein by reference, describes several exemplary media identification technologies which are, for, example, based on querying a media database using a medium identifier or 'fingerprint'. When the medium is inserted into a media playing device (for example a CD-ROM or DVD-ROM drive of a personal computer), medium content characteristics such as number of tracks or track offsets (track distance from beginning of medium) may be measured locally or read or implied from information in the medium TOC area. These characteristics can be used by a media identification service in a formula that generates the numeric identifier of the medium content. The numeric identifier can then used for searching a local database or sent for a remote database search via a computer network such as the Internet. If a match occurs, the matching media information can then be retrieved from the database and sent back to the device. This method provides a quick and efficient correspondence between a commercially pre-recorded medium and its descriptive information in the media database.

The last few years have seen increasing popularity of self-created media such as CD-R and CD-RW. Using PC software, users today can create both custom audio CD's and data CD's from music content on their hard drive. Similar to commercial CD's, custom CD's can be used across all systems capable of playing back a CD, so long as the files stored on the CD are in a format compatible with the player. A data CD may contain compressed audio files in MP3, Atrac3 or other Codec formats. These CD's may be played-back on portable, home, or car audio systems incorporating a decoder corresponding to the compressed file Codec format. Custom audio CD's and user created data CD's are often one of a kind and are not available commercially for multiple users. Therefore, existing media identification technologies, designed to identify commercial media only, may not identify either custom audio or data CD's.

An audio file fingerprint is a numeric value or other coded value that represents a recording instance of an audio session. Track fingerprints can be codec, bitrate, recording source/device, and acoustical filter independent. By virtue of its nature, a track fingerprint can be independent of the medium on which the track was recorded. So, for example, recording of Santana's song 'Jingo' from the album 'The best of Santana' and the album 'Santana,' as well as a compressed file such as MP3 residing on a computer's hard disk, may all have the same fingerprint. However, the song 'Jingo' from the albums 'Santana' recorded in a studio and the same song recorded in a live performance on the album 'Live at the Fillmore 1968' will likely have two different fingerprints. Fingerprinting technologies may be used to identify content on a medium on a track-by-track basis when the method employing the media identifier fails to identify the media.

Since a multiplicity of media types containing music exist, certain embodiments may incorporate both media identifier and fingerprinting methods. Certain embodiments attempt to identify the nature of the medium before attempting identification. In case that the media is non-commercial, a track-by-track identification procedure can be used. Otherwise, a process combining fingerprinting and a medium identifier can be performed to locate medium information in a database.

Provided a connection to a network such as the Internet exists, artist, track, and other album related information may be rapidly retrieved from remote databases. However, incorrect or no information might be provided for non-commercial media. Certain embodiments provide identification to a variety of commercial as well as non-commercial media. In certain embodiments, an acoustic sample is extracted from a music file and translated to an audio fingerprint.

As indicated above, media can be categorized as either of two different types: commercial and non-commercial media. Some examples of commercial media are: original commercial media, commercial remix media, and commercial reprint media. Media produced in large quantities such as counterfeit or custom created media for private use of large groups, may be identified by existing media identification technologies in spite of the fact that it was not produced in the traditional commercial manner. In this document these media, as well as other media mentioned above, are referred to with the overall term 'commercial media'. Some examples of non-commercial media are: non-commercial duplication of commercial media, non-commercial mix media, and compressed format media (sometimes referred to as data media).

Turning now to FIG. 1, an exemplary medium identification system 100 consistent with certain embodiments is shown. Medium identification system 100 has a computer 104 with a local media database 108. Local media database 108 can also include fingerprint and metadata information to allow the processes described herein to function locally. Computer 104 has a media player 110 (e.g., CD-ROM drive, DVD-ROM drive, CD-RW drive, USB port, MiniDisc Drive, Tape Drive, etc.) which can be internal to, or connectively coupled to, computer 104, and can be embodied as a single medium or multiple media device. The method of coupling media player 110 can be embodied as any connection mechanism, such as for example and not limitation, digital or analog cable, Internet, or other wired or wireless network communication. Media player 110 accepts any computer readable medium 112 (e.g., a CD-ROM, DVD-ROM, CD-RW, CD-R, memory stick, hard disk and other magnetic media, MiniDisc, Tape, etc.). Computer 104 is coupled to a network 116, such as the Internet, or a local or wide area network. Using network 116, computer 104 is coupled to a media identification server 120 and a metadata server 124. Media identification server 120 is coupled to a fingerprint database 128 and a media database 132, while metadata server 124 is coupled to a metadata database 136.

Collectively, fingerprint database 128, media database 132, and metadata database 136 are defined herein as remote databases when fingerprint, identification, and metadata servers are not local (e.g., when situated in a remote location and connected via a network, for example) as with local media database 108 (e.g., which is in close physical proximity and may be directly connected by wired or wireless connection to the computer or playback device). It should be noted, that media identification server 120 and metadata server 124 could be combined into one server. Likewise, fingerprint database 128, media database 132, and metadata database 136 could be combined into one database. Further, any possible permutation of information arrangement can be created for use as described herein. It should also be apparent to those skilled in the art upon consideration of the present teaching that computer 104 could be connected or communicating to a separate device utilizing the medium for purpose of playback, ripping, transcoding, or duplicating all or portion of the medium content. With an understanding of this combination of devices, servers and databases, the following methods and apparatus can now be discussed.

In certain embodiments, the methods and apparatus for medium identification using medium identification system 100 can use a hierarchical approach to medium identification. Sequential escalating communication sessions between computer 104 and either media identification server 120 and metadata server 124 can be used. During a first communication session minimal identifying information for the identification of the medium content can be transmitted, if it is available, with more information transmitted during a second communication session if identification is not achieved during the first identification session. Using this hierarchical escalating approach, communication bandwidth and identification time can be conserved if the first minimal information session is successful. This hierarchical approach will be discussed in more detail later.

In certain embodiments, the methods and apparatus for medium content identification using medium identification system 100 can use a one-time approach to medium content identification. A one-time communication session between computer 104 and either media identification server 120 and, metadata server 124 can be used. During this one time communication session all identifying information for the identification of the medium content can be transmitted. Using this one-time approach, identification time can be conserved. This one-time approach will also be discussed in more detail later.

Thus, a medium identification system consistent with certain embodiments has a media content reader, a programmed processor that creates a medium identifier from at least two of a number of tracks on the medium, a distance, and a track fingerprint read by the media content reader, a server, an interface that connects the programmed processor to the server, and a database of content information searched by the server using the medium identifier.

Figure 2:
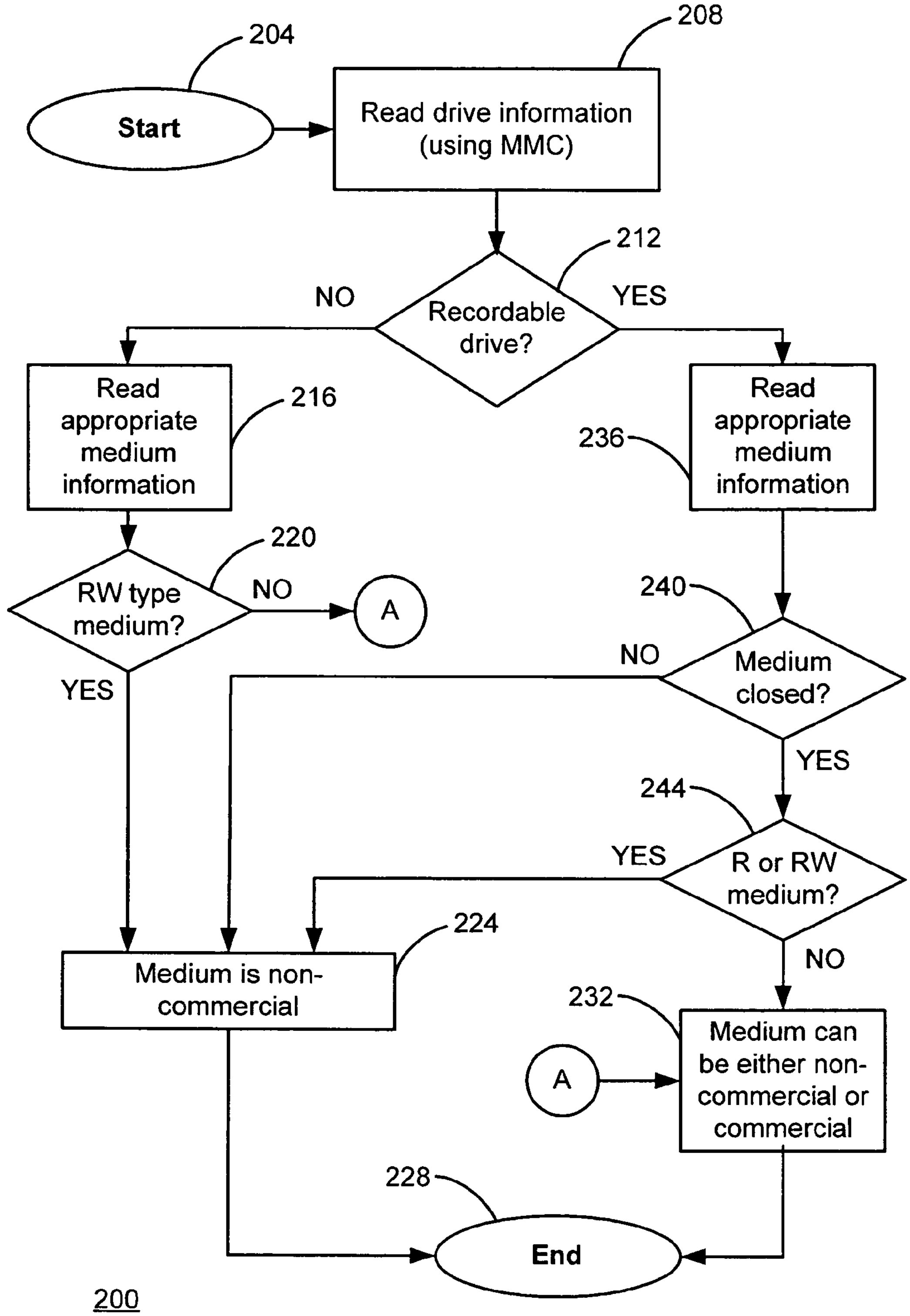
FIG. 2 is an illustrative non-commercial medium test consistent with certain embodiments of the present invention.

Turning now to FIG. 2, an illustrative non-commercial medium test 200 is shown. Non-commercial medium test 200 represents one embodiment of a test to determine whether the medium is non-commercially created. The ability to distinguish between commercial and self-created (non-commercial) medium allows both the methods and apparatus for medium identifications and the methods and apparatus for database maintenance and enhancement to be more reliable and efficient. This ability to distinguish between commercial and self-created medium also allows the database contents to be less cluttered and more cogent. As more and more non-commercial (i.e., self-created) media are presented to a database system for identification, a potentially unlimited number of collections could result. If a database system were to attempt to archive all self-created collections, a prohibitively large amount of storage in the given database might be required. Further, such a large database, the search time for a given database record might be unacceptably large. By excluding self-created medium from a given database, the database search time and storage are greatly reduced. On the other hand, if a database did not contain a database record for a given commercial release, it could be desirable to add the commercial release to the media database.

The non-commercial medium test 200 of this embodiment results in one of two answers: "non-commercially created medium" or "medium that can be commercially or non-commercially created medium". The test could be performed on any property of the medium dictated by the media specifications (such as Red book audio specifications for audio CD) that does not appear on a recordable medium governed by different media specifications (such as Orange book specifications for CD-R & CD-RW). In addition, properties of the recordable medium could be used to identify that it is not commercially created. Because of the variety of media burning applications, devices, and properties of recordable media (such as CD-R and CD-RW) it may be possible to identify if the medium is non-commercially created.

Non-commercial medium test 200 begins at 204. At 208, drive information is read from the media drive that is coupled to computer 104. A method such as reading Multi-Media Command (MMC) set is used at this stage to gather information from the drive. At 212, a determination is made about whether the drive is a recordable drive (i.e., a drive that can record a recordable medium) based upon the information gathered at 208. Depending on the nature of the drive, a different type of process will take place. If the drive is determined to be a non-recordable drive (such as standard CD-ROM's), a transition is made to 216.

At 216, information is read from the medium itself. In the case of non-R/RW drives an RW medium can be identified. In this embodiment, the identification of CD-RW is based on reflectivity of the CD-RW, but any test that can make this distinction can also be used, including a manual user input. Because of the nature of CD-RW medium, its reflectivity is different from that of other medium. The Mode Sense Data signal for the drive can be used to identify the reflectivity difference. However, the reflectivity measure is generally not able to distinguish between CD-R and commercially stamped media (at this time). Therefore, the result of the reflectivity reading is 'non-commercial' if the medium is CD-RW and 'uncertain' if the medium is a different media type. If the test is able to distinguish between CD-R and commercially stamped media, then the test can be improved and the above-mentioned uncertainty removed. The process can then transition to extracting fingerprints for all tracks on the medium rather than searching with one track fingerprint when a CD-R is determined to be the subject medium. If the medium is determined to be CD-RW at 220, a transition to 224 is made with the medium being non-commercial and the process ends at 228. If the medium is determined not to be CD-RW at 220, a transition is made to 232 with the medium being either non-commercial or commercial and the process ends at 228.

If the drive is determined at 212 to be a R/RW drive (such as a CD-RW drive), a transition is made to 236 where information is read from the medium itself. In the case of R/RW drives, the first verification is whether the medium is closed or unclosed at 240. An unclosed medium is a non-commercial medium and a transition is made to 224 and the process ends at 228. Note that some burning applications allow creation of audio sessions without closing or finalizing the medium itself. This type of medium would still be identified as non-commercial as the medium itself is not closed using the current test, but this should not be considered limiting. If the medium is closed a transition is made to 244. A closed medium could still be identified as a non-commercial medium in the case where the R/RW drive identifies recordable media characteristics. The characteristics could be for example ATIP (Absolute Time In Pre-groove) area information that does not exist in commercial media or the existence of subcode R-W on an audio CD. If ATIP information or subcode R-W information exists on the medium at 244, the medium is "non-commercially created medium" and a transition is made to 224 and the process stops at 228. If the medium cannot be determined to be R/RW at 244 (indeterminate), a transition is made to 232 with the medium being either non-commercial or commercial and the process ends at 228.

Thus, a method of testing a medium to determine whether it was non-commercially created consistent with certain embodiments involves determining if a drive is a recordable drive and if the drive is a recordable drive determining whether a medium is a closed medium. If the medium is not a closed medium, the medium can be considered non-commercial medium and a medium identification process can be carried out that depends upon whether the medium is non-commercially created medium. Further, if the drive is a recordable drive, a method of testing a medium to determine whether it was non-commercially created consistent with certain embodiments involves determining whether the medium comprises a writable medium and if the medium is a writable medium, the medium can be considered non-commercial medium. A method of testing a medium to determine whether it was non-commercially created consistent with certain embodiments can further involve, if the drive is not a recordable drive, performing a reflectivity test to determine if the medium is a re-writable medium, and if the medium is a re-writable medium, the medium can be considered non-commercial medium.

Figure 3:
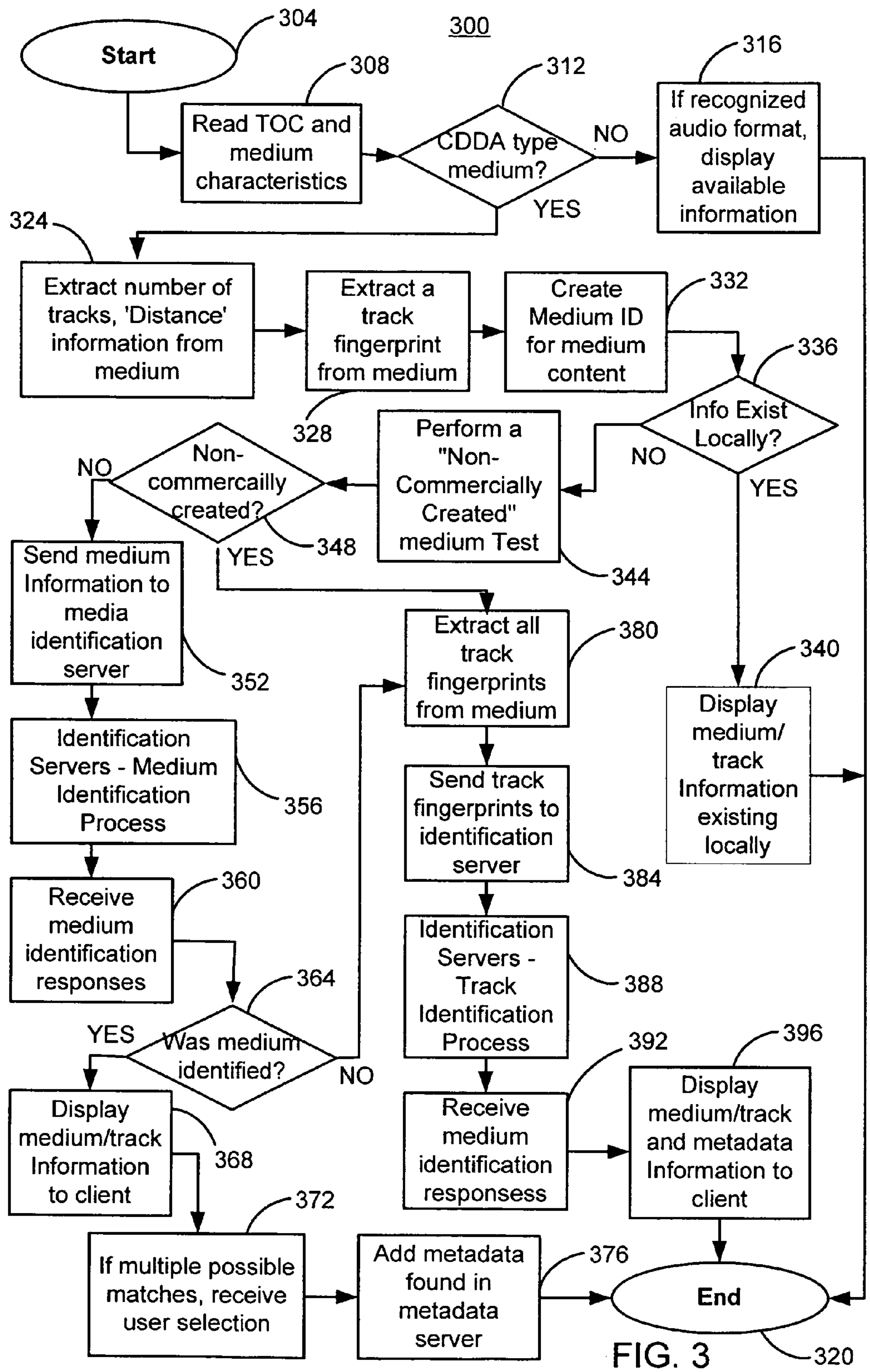
FIG. 3 is a medium identification method consistent with certain embodiments of the present invention.

Turning now to FIG. 3, medium identification method 300 is shown starting at 304. At 308, medium characteristics, such as the table of contents (TOC) are read from the medium, if they exist. At 312, a determination is made as to whether the medium is a medium containing Compact Disc Digital Audio (CDDA) or compressed format files (such as MP3). If the medium is a compressed format medium, a display of information provided in each individual file (such as ID3 tags of MP3 files) can be done at 316 and the process ends at 320. Accurate track information for compressed audio media can also be gathered, as will be discussed below, by a transition from 316 to 380. This option is not shown explicitly in FIG. 3 for the sake of simplicity and clarity, but all operations beginning at 380, discussed below, apply equally to the situation of compressed medium content. If the medium is not compressed format medium, medium identification method 300 reads the number of tracks on the medium and calculates a 'Distance' for the medium content at 324. Since the medium is inserted into a device (for example a CD-ROM or DVD-ROM drive of a personal computer), all physical values such as number of tracks or track offsets (track distance from beginning of medium) may be read from the TOC area or measured locally.

A 'Distance' is a potentially non-unique identifier of the medium content and is a numeric representation of any suitable physical property or properties of the medium content. For example, and without limitation, any product of offset information available in the TOC area could be used as the 'Distance'. Likewise, any bit-based product calculation such as the method taught in the above-referenced Yankowski patent could also be suitable distance metrics. Many other possibilities exist for the distance calculation, such as for example, the sum, product, difference or other mathematical combination of certain values stored in the TOC area. Any suitable calculation can be used. Several other mechanisms for determining a distance for use in a database search will become apparent to those skilled in the art after consideration of this disclosure.

At 328, medium identification method 300 extracts a fingerprint from one of the tracks on the medium (for example the first track on the medium) and at 332 a medium identifier is created for use in a database query. The medium identifier includes the number of tracks on the medium, the distance for the medium, and the fingerprint of one of the songs/tracks on the medium at this point. More detail about certain preferred embodiments of a medium identifier will be presented later. At this point it is sufficient to realize that a medium identifier is created.

At 336, a query of a local media database 108 is done using the medium identifier created at 332. If the information about the medium content is available locally, the information populates the medium/content fields on the device. The information can then be displayed to the user at 340, and the process ends at 320. If the information does not exist locally, non-commercial medium test 200, discussed above, is performed at 344.

A decision is made at 348 depending upon the outcome of non-commercial medium test 200. If the medium is determined by non-commercial medium test 200 to be commercially created or indeterminate (as discussed above), a transition to 352 is made and the medium identifier is sent to the media identification server 120 and metadata server 124. At 356, media identification server 120 then performs a medium content identification process based upon the medium identifier and metadata server 124 performs the metadata retrieval process, both of which will be discussed in more detail later in relation to FIG. 6. At 360, a response is received from media identification server 120 and metadata server 124. If a determination that the medium was identified is made at 364, a transition to 368 is performed where medium information can be displayed for the user. As will be discussed in relation to the medium identification process below, there is a possibility that multiple matches will be identified by the medium content identification process. If multiple matches can be identified and presented to the user as a medium list, the process receives a user selection of the appropriate identification for the medium content at 372. Any metadata that was found by metadata server 124 is presented to the user at 376 and the process ends at 320.

If the medium is determined to be non-commercially created by non-commercial medium test 200 at 348, or if the medium was not identified at 364, then there is no need to perform a further database query with the medium identifier created at 332. Instead, a track fingerprint is extracted from all tracks at 380 and the medium identifier is modified/extended, as will be discussed in more detail below, to include fingerprints for all tracks on the medium. At 384, the extended medium identifier is sent to media identification server 120 and metadata server 124. At 388, media identification server 120 then performs a track identification process based upon the extended medium identifier and metadata server 124 performs the metadata retrieval process, both of which will be discussed in more detail later in relation to FIG. 7. At 392, a response is received from media identification server 120 and metadata server 124. The information retrieved for all tracks is displayed to the user along with metadata information at 396 and the process ends at 320.

Thus, a method of medium content identification consistent with certain embodiments can involve performing a non-commercial medium test. If the medium content is non-commercial content, the process extracts fingerprints for all tracks of the medium content from the medium, creates a medium identifier comprising fingerprints for all tracks of the medium content, and searches a database with the medium identifier. The method can further involve, if it cannot be determined that the medium content is non-commercial content, read and calculate information related to medium content from a medium, and create a medium identifier from at least two of a number of tracks on the medium, a distance, and a track fingerprint calculated from the medium.

Likewise, a method of medium content identification consistent with certain embodiments involves reading information related to medium content from a medium, creating a medium identifier, and searching a local media database for information using the medium identifier and creating local search results. If information does not exist in the local media database, the method further involves performing a non-commercial medium test and if the non-commercial medium test is indeterminate, requesting a search of a remote database using the medium identifier, and receiving a first remote search results from the remote database. If either the medium content is non-commercial content or if information does not exist in the remote database, the method further involves extracting fingerprints for all tracks of the medium content from the medium, creating an extended medium identifier having fingerprints for all tracks of the medium content, requesting a search of a remote database using the extended medium identifier, and receiving a second remote search results from the remote database. The results of any of the above-mentioned searches can be displayed to a user.

In some cases, system design can provide media content information based on fingerprinting information at all times. In these cases, 380 can follow 336 without performing a "Non-Commercially Created" test. Examples for such cases include, but are not limited to the following: availability of high speed network access such as DSL, Cable Modem, optical cable, or high speed wireless networks, requirement to prioritize the use of fingerprinting database in cases such as fingerprint-based data consistency, accuracy, enhancement of the fingerprint database, simplification of design of systems that do not provide a performance penalty.

Figure 4:
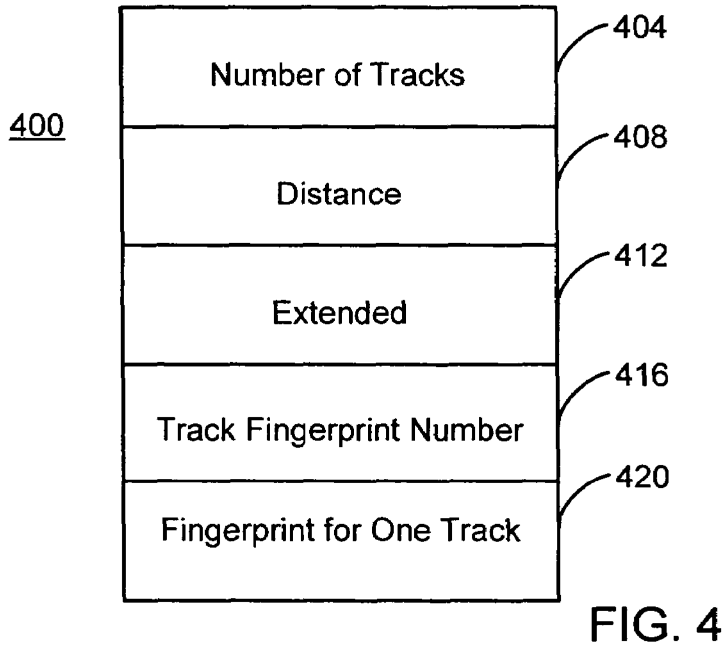
FIG. 4 is an exemplary medium identifier consistent with certain embodiments of the present invention.

Turning now to FIG. 4, one possible embodiment of the medium identifier created at 332 is shown as medium identifier 400. A data segment containing a data field for the number of tracks exists as 404. A data segment containing a data field for the distance exists as 408. A data segment containing a data field indicating whether the medium identifier is an extended medium identifier exists as 412. In the case of a medium content identification process, such as the one described below in relation to FIG. 6, data field 412 will indicate that the identifier is not an extended identifier. A data segment containing a data field that indicates the track fingerprint number on the medium exists at 416 to help with the identification process. As discussed above, the track fingerprint used in the identification process does not have to be the first track on the medium. The track fingerprint number identifies which track was selected from the medium content for fingerprinting. A data segment containing a data field for the track fingerprint exists as 420. Generally, a medium identifier can contain any two or more of the number of tracks, the distance, and the track fingerprint (plus the associated supporting data segments such as the track number if the track fingerprint is used) to allow a search. The order of the data segments can be rearranged without departing from embodiments of the invention. Other arrangements of the data will also occur to those skilled in the art upon consideration of the current teaching.

Thus, a computer data signal embodied in a bit stream consistent with certain embodiments has at least two of a segment of data representing a number of tracks of content on a medium, a segment of data representing a distance calculation for the content on the medium, and a segment of data representing a track fingerprint.

It is noted that the contents of FIG. 4 show the conceptual structure of information contained in the medium identifier. This is not intended to be limiting and the medium identifier itself may be a numeric representation of the information, and is not limited to the presentation format presented herein.

Figure 5:
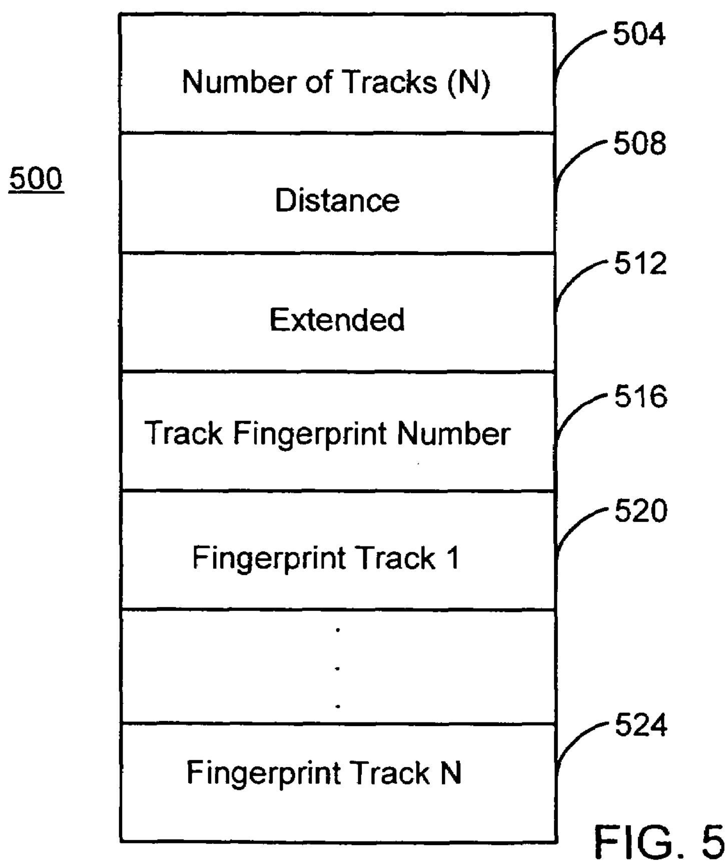
FIG. 5 is an exemplary extended medium identifier consistent with certain embodiments of the present invention.

Turning now to FIG. 5, one possible embodiment of a suitable extended medium identifier, modified at 380 and containing fingerprints for all tracks is shown as medium identifier 500. Data segment 504 contains a data field for the number of tracks (N) for the medium content. Data segment 508 contains a data field for the distance for the medium. Data segment 512 contains a data field indicating in this case that the medium identifier is an extended identifier and contains track fingerprints for all tracks on the medium. Data segment 516 contains a data field that indicates the track fingerprint number on the medium to help with the identification process. In the present case of an extended medium identifier that contains fingerprints for all tracks on the medium, this field can contain any unique identifier that indicates that all track fingerprints are present. The order of the data segments can be rearranged without departing from embodiments of the invention.

Those skilled in the art will recognize, upon consideration of the present teaching, that the indication that this is an extended medium identifier in data segment 512 is sufficient to indicate that all tracks are present. As such, data segment 516 contains somewhat redundant information in the case of an extended medium identifier. However, data segment 516 is preserved in this embodiment to allow indexing to the first fingerprint within the medium identifier from the beginning of the medium identifier to be consistent between the extended and non-extended medium identifiers. In another embodiment, data segment 516 can be removed altogether and the process that parses and interprets the medium identifier can be designed to locate the first fingerprint in an extended medium identifier at the relative location of the track fingerprint number for the non-extended identifier. Either arrangement is sufficient for the purpose of parsing the medium identifier and many such variations are contemplated at the time of this writing. Other variations are also possible consistent with certain embodiments.

Data segment 520 contains a data field for the track fingerprint for track number one (1) of the medium content. A separate data segment is created in medium identifier 500 for each track fingerprint and each data segment so created contains the track fingerprint for the respective track. The final track fingerprint for track N is stored in data segment 524. A track identification process, such as the one described below in relation to FIG. 7, can use the data field representing the number of tracks on the medium, stored in data segment 504, to determine the number of track fingerprints stored in medium identifier 500 (i.e. the size of medium identifier 500). Accordingly, the length of medium identifier 500, with a varying number of data segments, can be dynamic in size without a separate length field specifying the length.

It is contemplated that track fingerprinting algorithms will evolve over time. Different algorithms can provide different sized track fingerprints that can be a part of a medium identifier (such as medium identifier 400 or medium identifier 500). Likewise, a fingerprinting algorithm may create different sized fingerprints depending upon the content that is being fingerprinted. In either case, the medium identifier data segment for the track fingerprint can be modified to include a length field at the beginning of the data segment for the fingerprint. By including a length field at the beginning of each fingerprint data segment, a process that parses and interprets a medium identifier can be designed to accommodate any fingerprint format and any length medium identifier.

Thus, a computer data signal embodied in a bit stream consistent with certain embodiments of the present invention has a segment of data representing a number of tracks of content on a medium, a segment of data representing a distance calculation for the content on the medium, a segment of data representing an indication that the bit stream comprises track fingerprints for all tracks on the medium, and multiple segments of data each representing a track fingerprint for one track on the medium.

Figure 6:
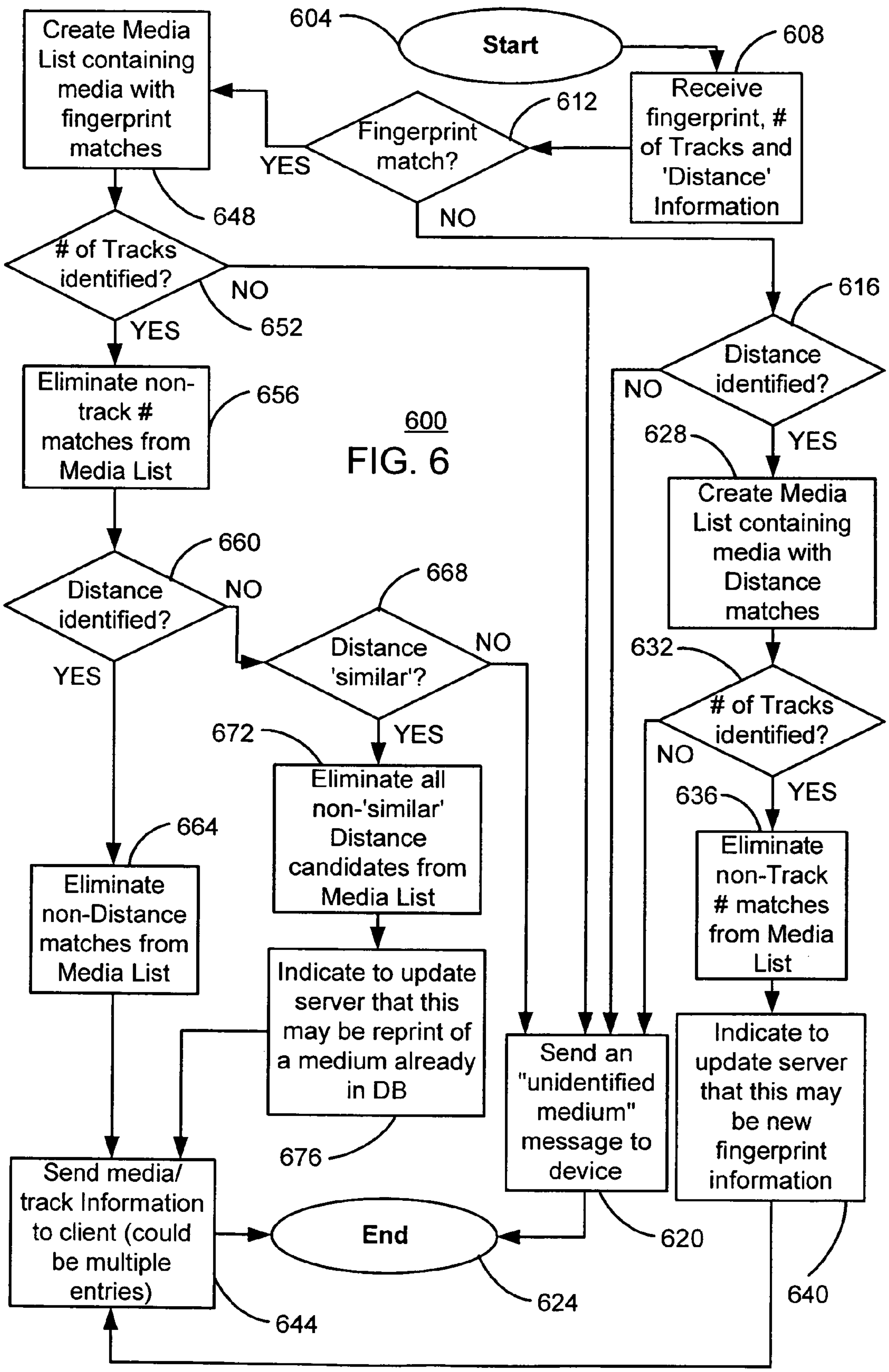
FIG. 6 is a medium content identification process consistent with certain embodiments of the present invention.

Turning now to FIG. 6, one possible embodiment of a medium content identification process is shown as medium content identification process 600. Medium content identification process 600 may form a component of medium identification method 300, discussed above in relation to item 356 of FIG. 3, and may be performed, on a server or set of servers (such as media identification server 120 and metadata server 124) that are coupled to relevant databases that contain information useful for the identification process.

Medium content identification process 600 begins at 604. At 608, the identification server receives a track fingerprint, number of tracks on the medium, and a 'Distance' representing the medium content from medium identification method 300 in the form of medium identifier 400.

At 612, the server attempts to find matches in the media database containing the identified track in a certain location (for example all media containing an identified track as first track on that medium). If no fingerprint match is found at 612, a distance search is done at 616. If a distance is not identified at 616, an unidentified content message is sent to medium identification method 300 at 620 and the process ends at 624. However, if a distance match is made at 616, a media list is created at 628 with all medium identified with the same distance. Considering that there may be different recordings of the same track on different media, a media list can be created to help determine which medium is the subject of the inquiry. The media list incorporates all media containing the identified track in the same location on the disc as in the medium in the device. In many cases, the media list may be only one medium that contains the track on the same location.

At 632, the number of tracks in the medium identifier is compared with all possible matches in the media list to determine whether there is a match in the number of tracks in any of the items in the media list. If there are no matches regarding the number of tracks, a transition is made to 620 where an unidentified content message is sent to medium identification method 300 and the process ends at 624. However, if there is a match with the number of tracks with any item in the media list, all non-matching items are removed from the list at 636 and an indication is posted at 640 that this may be a new fingerprint and that this content information can be added to the database. It could happen that some medium entries in the media database may not have all tracks fingerprinted in the track database, so adding this information will help fill gaps in the database information.

At 644, the medium information is returned to medium identification method 300. If there remain multiple options in the media list, the user can select the appropriate medium identification and the user acknowledged selection is sent to a track identification server process for storing track information based on medium data. Repeated user entries of the same medium-based track information can be entered as valid track data that is associated with the track fingerprint to eliminate erroneous entries by the user in this embodiment. The process then ends at 624.

The other possible branch of decision block 612 occurs when there is a fingerprint match. In this case, a transition is made to 648 where a media list is again created with all possible matches. At 652, an inquiry is made as to whether there is a match in the number of tracks on the subject medium. If there is no match in the number of tracks at 652, an unidentified content message is sent to medium identification method 300 at 620 where it can be sent to the user at this point, and the process ends at 624. However, if there is a match in the number of tracks, all non-matching media list entries are removed at 656. The media list will still contain at least one item at this point, but still may contain more than one item.

At 660, the remaining items in the media list can be compared with the subject medium for the distance measurement. For example and not by way of any limitation, if the distance used is the sum of the lengths of all tracks on a medium, a distance of a medium entry in the database that is within a specified percentage deviation from the subject medium might be considered adequately similar (e.g., a fraction of a percent). Similarly, if the distance is within a specified absolute distance from that of a medium entry in the database (e.g., several milliseconds), the subject medium might be considered adequately similar. But, these examples are only exemplary starting points and reasonable measures of what can be considered "similar" within the meaning of this technology can be experimentally refined over time. Methods such as Expert Systems with over-time adjusting values, Neural Networks, as well as variety of other algorithms can be used to determine a valid similar distance.

If there is a distance match at 660, all non-matching entries are removed from the list at 664 and the remaining search results are returned to medium identification method 300 at 644. If there remain multiple options in the media list, the user can select the appropriate medium identification and, the user acknowledged selection is sent to a track identification server process for storing medium information based on medium data. Repeated entries of the same medium-based information can be entered as valid data that are associated with the medium to eliminate erroneous entries by the user in this embodiment. The process then ends at 624.

If there is no identical distance match at 660, a 'Similar Distance' search is performed at 668. If the 'Distance' measured on the medium in the device is similar to any of those media in the media list, the disc may be a commercial reprint medium. In that case there is a benefit to record medium information in the media database, as it will allow for quick identification in the future (meaning exact 'Distance' match). A user can acknowledge an item from the 'Similar Distance' search at 668. Once multiple users acknowledge a match and the medium information has been confirmed by a large number of users, an entry could be permanently made in the media database. This entry would be a confirmation of reprint or duplicated medium. In this fashion, the media database could be continuously updated and enhanced.

Since non-commercial media duplication processes depend on properties of the writable medium as well as the software and hardware used for burning, in some cases that medium may not be "similar enough" to be identified even in cases where it is a custom duplication of commercial media. If there are no similar matches at 668, an unidentified content message can be sent to medium identification method 300 at 620 and the process ends at 624.

However, if there are any similar matches in the media list at 668, any non-similar items are removed from the media list at 672 and an indication is posted at 676 that there is a benefit for recording medium information in the media database. The remaining search results are returned to medium identification method 300 at 644. If there remain multiple options in the media list, the user can select the appropriate medium identification and the user acknowledged selection is sent to a track identification server process for storing medium information based on medium data. In this example, only repeated entries of the same medium-based information is entered as a valid data that is associated with the medium to eliminate erroneous entries by the user. The process then ends at 624.

Thus, a method of searching for medium content information consistent with certain embodiments involves receiving a medium identifier that has at least two of a number of tracks of content on a medium, a distance calculation for the content on the medium, and a track fingerprint for one track on the medium. The exemplary method further involves searching a database using the medium identifier, creating a media list comprising a list of information resulting from the search, and returning the search results.

Figure 7:
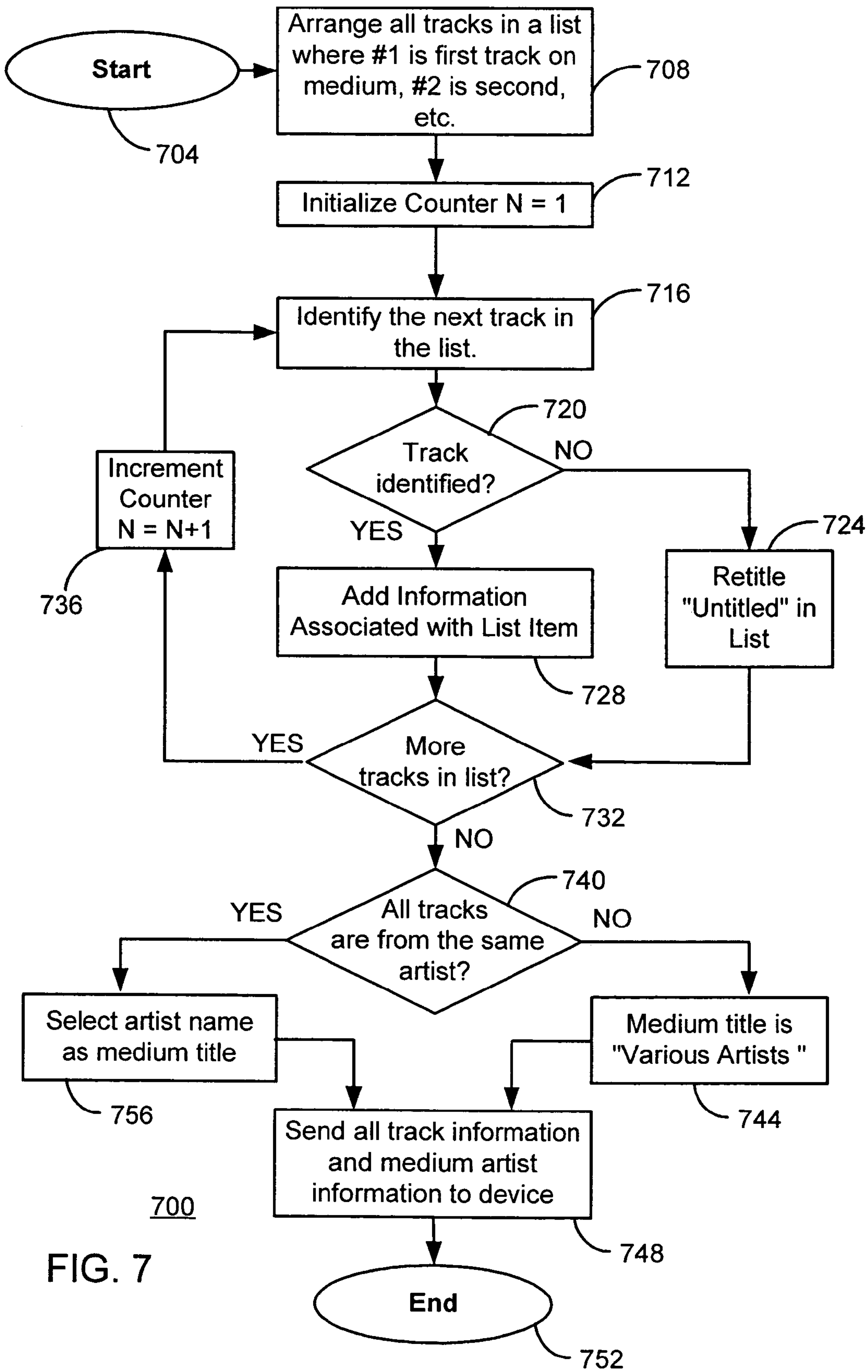
FIG. 7 is a track identification process consistent with certain embodiments of the present invention.

Turning now to FIG. 7, one possible embodiment of a track identification process is shown as track identification process 700. Track identification process 700 is a component of medium identification method 300, discussed above in relation to item 388 of FIG. 3, and is performed, on a server or set of servers (such as media identification server 120 and metadata server 124) that are coupled to relevant databases that contain information useful for the identification process.

Track identification process 700 begins at 704. At 708, fingerprints of all (not yet identified) tracks on the medium are received at a server and are arranged in a list of tracks by their location on the medium. At 712, a counter is initialized to start at the first item in the list. In this example, the counter is initialized to "one" to represent the first item in the list. This should not be considered limiting however, as it is common in algorithmic development that the first item in a list is referenced procedurally as item "zero" and as such an initialization of "zero" would be equally effective.

At 716, the next track in the list is analyzed and a search is executed to attempt to find a match for the track. At 720, a determination is made as to whether a match was found. If no match was found, the track is re-titled to "untitled" in the list at 724 allowing the user to replace this title with a title of their choice later on. However, if a match is found at 720, the information retrieved is associated with the list item at 728. At 732, a determination can be made as to whether there are any more tracks in the list to analyze and perform a search on. If there are more tracks in the list, the counter is incremented at 736 and the next item from the list is retrieved at 716. This process repeats until all tracks have been analyzed. When there are no more items in the list at 732, the process transitions to 740.

At 740, a determination can be made as to whether all tracks have been identified to be from the same artist. If not, the medium can be titled "Various Artists" (or similar) at 744, the results are returned to medium identification method 300 at 748 and the process ends at 752. If all selections are from the same artist, the medium can be named after the artist at 756, the results are returned to medium identification method 300 at 748 and the process ends at 752. There are many possibilities for providing a different system for medium content naming, for example and without limitation, based on album data or based on available metadata. Those skilled in the art will understand, upon consideration of the present teaching, that a variety of medium content naming options are available.

Thus, a method of searching for medium content information consistent with certain embodiments involves receiving a medium identifier that has a number of tracks of content on a medium, a distance calculation for the content on the medium, and track fingerprints for each track on the medium. The method further involves creating a list of track fingerprints, searching a database using the list of track fingerprints, creating a media list comprising a list of information for each track resulting from the search, and returning the search results.

Figure 8:
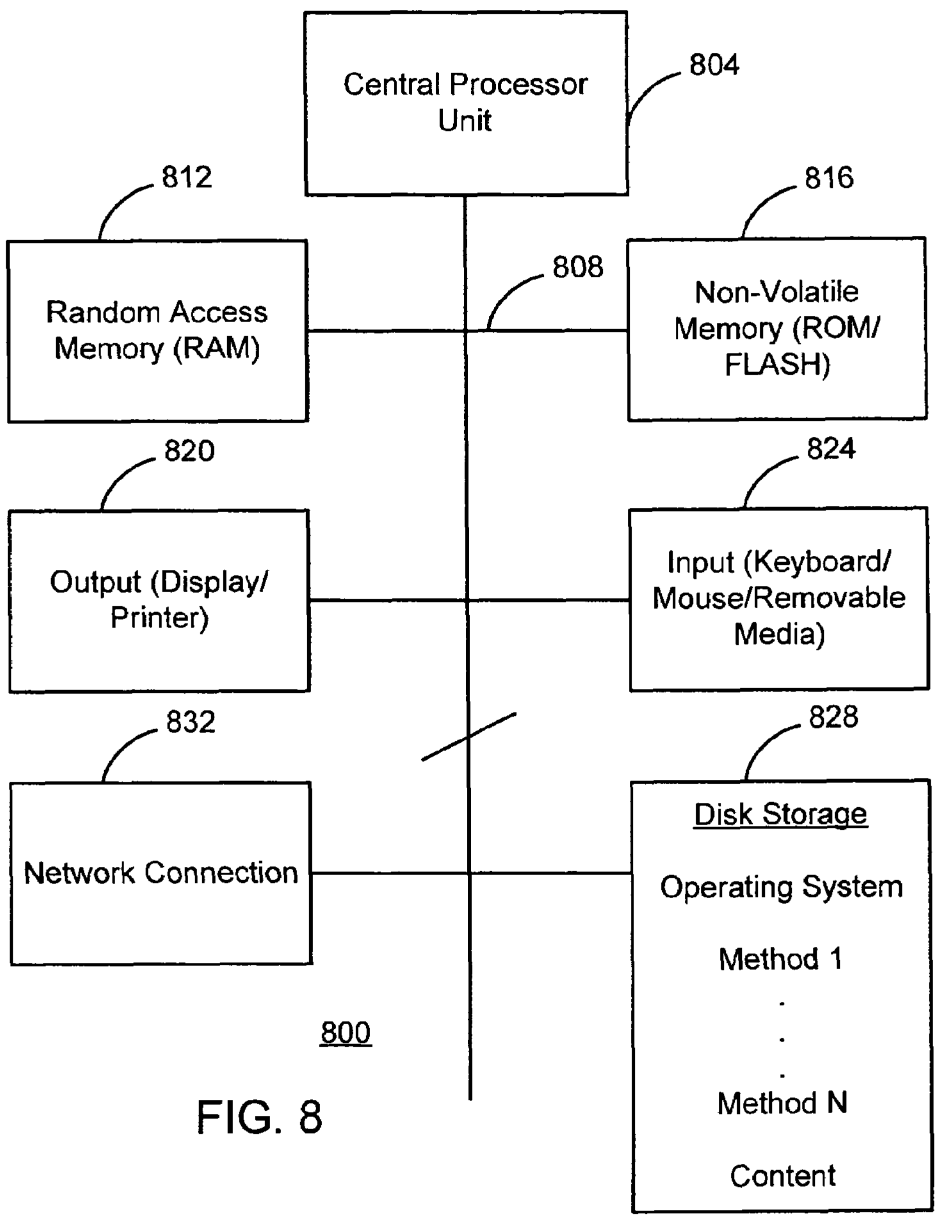
FIG. 8 is a computer system consistent with certain embodiments of the present invention.

The processes previously described can be carried out on a programmed general purpose computer system, such as the exemplary computer system 800 depicted in FIG. 8. Computer system 800 has one or more central processor units (CPU) 804 with one or more associated buses 808 used to connect the central processor unit 804 to Random Access Memory 812 and/or Non-Volatile Memory 816 in a known manner. An output mechanism at 820, such as a speaker system, display, or printer, may be provided in order to play, display and/or print output for the computer user, as well as to provide a graphical user interface (GUI). Similarly, input devices such as keyboard, mouse, computer-connected portable audio devices, and removable media readers 824 may be provided for the input of information by the computer user. Computer 800 also incorporates internal and/or external disc or other mass storage 828 for storing large amounts of information including, but not limited to, the operating system, program files, data files, and content. Computer system 800 may be coupled to a local area network (LAN) and/or wide area network (WAN) and/or the Internet using a network connection 832 such as an Ethernet adapter coupling computer system 800, possibly through a firewall. While depicted as a single computer, multiple linked computers can be used to carry out the functions described herein.

The above-mentioned methods and apparatus can be used to identify information from many media types. The apparatus may include, for example, a built-in, externally connected, or externally linked media playback, recording and manipulating mechanism. Some examples that are consistent with certain embodiments of the present invention are CD-ROM, DVD-ROM, CD-RW, CD-R, memory stick, hard disk and other magnetic media, MiniDisc, Tape, Additional implementations may include, but are not limited to playback, recording, transcoding, duplicating or transmitting apparatus connected via digital or analog cable, Internet, or other wired or wireless network communication to computer system 800.

Those skilled in the art will recognize that certain exemplary embodiments can be based upon use of a programmed processor. However, certain embodiments could be implemented using hardware component equivalents such as special purpose hardware and/or dedicated processors which are equivalents as described and claimed. Similarly, general purpose computers, microprocessor based computers, micro-controllers, optical computers, analog computers, dedicated processors and/or dedicated hard wired logic may be used to construct alternative equivalent embodiments.

Those skilled in the art will also appreciate that the program processes and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Certain embodiments can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from certain embodiments of the invention. Error trapping can be added and/or enhanced and variations can be made in user interface and information presentation without departing from the present invention. Such variations are contemplated and considered equivalent.

While specific embodiments have been described, it is evident that many alternatives, modifications, permutations and variations will become apparent to those skilled in the art in light of the foregoing description.

What is claimed is:

1. An apparatus for medium content identification, comprising:

a media content reader;

a programmed processor;

program means, running on the programmed processor, for conducting a non-commercial media test, wherein if the medium content comprises non-commercial content, the program means extracts fingerprints for all tracks of the medium content from the medium, creates a medium identifier comprising fingerprints for all tracks of the medium content;

if the medium comprises commercial medium, the program means further creating a medium identifier from at least two of a number of tracks on the medium, a distance comprising a numeric representation of a physical property or properties of the medium content, and a track fingerprint read by the media content reader;

a server;

an interface that connects the programmed processor to the server; and a database of content information searched by the server using the medium identifier.

2. The apparatus of claim 1, wherein the content information comprises information relating to at least two of track fingerprint information, media information, and metadata information.

3. The apparatus of claim 1, wherein the database comprises multiple databases with at least two of a fingerprint database, a media database, and a metadata database.

4. The apparatus of claim 1, further comprising a local database with content comprising information relating to at least two of track fingerprint information, media information, and metadata information.

5. The apparatus of claim 4, wherein the local database comprises multiple databases with at least two of a fingerprint database, a media database, and a metadata database.

6. The apparatus of claim 1, wherein the interface comprises a network interface.

7. The apparatus of claim 6, wherein the network interface connects the programmed processor to the server over one of an Internet, a local area network, and a wide area network.

8. The apparatus of claim 1, wherein the medium identifier further comprises a track number for the track fingerprint.

9. The apparatus of claim 1, wherein the medium identifier further comprises a plurality of track fingerprints.

10. The apparatus of claim 1, wherein the programmed processor further performs a non-commercial medium test on the medium.

11. An apparatus for medium content identification, comprising:

means for reading information from a medium;

program means, running on a programmed processor, for conducting a non-commercial media test, wherein if the medium content comprises non-commercial content, the program means extracts fingerprints for all tracks of the medium content from the medium, creates a medium identifier comprising fingerprints for all tracks of the medium content;

means for creating a medium identifier from at least two of a number of tracks on the medium, a distance, wherein the distance comprises a numeric representation of a physical property or properties of the medium content and a track fingerprint read from the medium;

if the medium is commercial means for retrieving information from a database of medium content information; and means for searching the database of medium content information to retrieve medium content information by using the medium identifier.

12. The apparatus of claim 11, wherein the database of medium content comprises a remote database and comprises information relating to at least two of track fingerprint information, media information, and metadata information.

13. The apparatus of claim 11, wherein the database of medium content comprises multiple remote databases with at least two of a fingerprint database, a media database, and a metadata database.

14. The apparatus of claim 11, wherein the database of medium content comprises a local database and comprises information relating to at least two of track fingerprint information, media information, and metadata information.

15. The apparatus of claim 14, wherein the local database comprises multiple databases with at least two of a fingerprint database, a media database, and a metadata database.

16. The apparatus of claim 11, wherein the means for retrieving information comprises a network interface.

17. The apparatus of claim 16, wherein the network interface provides access to the database of medium content information through one of an Internet, a local area network, and a wide area network.

18. The apparatus of claim 11, wherein the medium identifier further comprises a track number for the track fingerprint.

19. The apparatus of claim 11, wherein the medium identifier further comprises a plurality of track fingerprints.

20. A computer-implemented method of medium content identification, comprising:

performing a non-commercial medium test;

if the medium content comprises non-commercial content:

extracting fingerprints for all tracks of the content form the medium;

creating a medium identifier comprising fingerprints for all tracks of the medium content; and searching a database with the medium identifier if the medium comprises commercial content;

extracting a medium identifier comprising at least two of:

a number of tracks of content on a medium;

a distance calculation for the content on the medium, wherein the distance comprises a numeric representation of a physical property or properties of the medium content; and a track fingerprint for one track on the medium; and searching a database using the medium identifier.

21. The method of claim 20, wherein the medium identifier further comprises one of a distance and a number of tracks on the medium.

22. The method of claim 20, further comprising displaying the search results.

23. The method of claim 20, wherein the searching comprises a search in a local database.

24. The method of claim 20, wherein the searching comprises a search in a remote database.

25. The method of claim 24, wherein searching in the remote database comprises searching through a network.

26. The method of claim 25, wherein the network comprises at least one of an Internet, a local area network, and a wide area network.

27. The method of claim 20, wherein the database comprises information relating to at least two of track fingerprint information, media information, and metadata information.

28. The method of claim 20, wherein the database comprises multiple databases with at least two fingerprint database, a media database, and a metadata database.

29. A computer readable medium storing instructions which, when executed on a programmed processor, carry out a process comprising:

performing a non-commercial medium test, comprising:

if the medium content comprises non-commercial content:

extracting fingerprints for all tracks of the medium content from the medium;

creating a medium identifier if the medium comprises commercial content;

extracting a medium identifier comprising at least two of:

a number of tracks of content on a medium;

a distance calculation for the content on the medium, wherein the distance comprises a numeric representation of a physical property or properties of the medium content; and a track fingerprint for one track on the medium; and searching a database using the medium identifier comprising fingerprints for all tracks of the medium content; and searching a database using the medium identifier.

30. The computer readable medium of claim 29, further storing instructions which, when executed on the programmable processor, carry out a process of displaying the search results.

31. A computer-implemented method of medium content identification, comprising:

reading information related to medium content from a medium;

creating a medium identifier;

searching a local database for information using the medium identifier and creating local search results;

if information does not exist in the local database:

performing a non-commercial medium test;

if the non-commercial medium test is indeterminate:

requesting a search of a remote database using the medium identifier;

receiving a first remote search results from the remote database;

if either the medium content comprises non-commercial content or if information does not exist in the remote database:

extracting fingerprints for all tracks of the medium content from the medium;

creating an extended medium identifier comprising fingerprints for all tracks of the medium content; and requesting a search of a remote database using the extended medium identifier; and receiving a second remote search results from the remote database.

32. The method of claim 31, further comprising displaying at least one of the local search results, the first remote search results, and the second remote search results.

33. A computer readable medium storing instructions which, when executed on a programmed processor, carry out a process comprising:

reading information related to medium content from a medium, comprising:

creating a medium identifier;

searching a local database for information using the medium identifier and creating local search results;

if information does not exist in the local database:

performing a non-commercial medium test;

if the non-commercial medium test is indeterminate:

requesting a search of a remote database using the medium identifier;

receiving a first remote search results from the remote database;

if either the medium content comprises non-commercial content or if information does not exist in the remote database:

extracting fingerprints for all tracks of the medium content from the medium;

creating an extended medium identifier comprising fingerprints for all tracks of the medium content; and requesting a search of a remote database using the extended medium identifier; and receiving a second remote search results from the remote database.

34. The computer readable medium of claim 33, further storing instructions which, when executed on the programmed processor, carry out a process of displaying at least one of the local search results, the first remote search results, and the second remote search results.

35. An apparatus for medium content identification, comprising:

a media content reader;

a programmed processor;

a program that performs a non-commercial medium test on the medium, wherein if the medium content comprises non-commercial content, the program extracts fingerprints for all tracks of the medium content from the mediums creates a medium identifier comprising fingerprints for all tracks of the medium content, and searches a database with the medium identifier;

an interface that connects the programmed processor to a remote server coupled to a database; and wherein if the medium is commercial, the programmed processor creates a medium identifier from at least two of a number of tracks on the medium, a distance, comprising a numeric representation of a physical property or properties of the medium content and a track fingerprint read by the media content reader and requests a database search from the remote server using the medium identifier.

36. The apparatus of claim 35, wherein the database content comprises information relating to at least two of track fingerprint information, media information, and metadata information.

37. The apparatus of claim 35, wherein the database comprises multiple databases with at least two of a fingerprint database, a media database, and a metadata database.

38. The apparatus of claim 35, further comprising a local database with content comprising information relating to at least two of track fingerprint information, media information, and metadata information.

39. The apparatus of claim 38, wherein the local database comprises multiple databases with at least two of a fingerprint database, a media database, and a metadata database.

40. The apparatus of claim 35, wherein the interface comprises a network interface.

41. The apparatus of claim 40, wherein the network interface connects the programmed processor to the remote server over one of an Internet, a local area network, and a wide area network.

42. The apparatus of claim 35, wherein the medium identifier further comprises a track number for the track fingerprint.

43. The apparatus of claim 35, wherein the medium identifier further comprises a plurality of track fingerprint.

44. The apparatus of claim 35, wherein the programmed processor further performs a non-commercial medium test on the medium.

45. A computer-implemented method of searching for medium content information, comprising:

receiving a medium identifier comprising at least two of:

a number of tracks of content on a medium;

a distance calculation for the content on the medium; wherein the distance comprises a numeric representation of a physical property or properties of the medium content and a track fingerprint for one track on the medium;

searching a database using the medium identifier, wherein the searching comprises sequentially searching the database for at least two of the number of tracks, the distance calculation and the track fingerprint in any order; if the search produces at least one match, creating a media list comprising a list of information resulting form the search; and returning the search results; and if the search does not produce at least one match, conducting a non-commercial media test, wherein if the medium content comprises non-commercial content:

extracting fingerprints for all tracks of the medium content from the medium;

creating a medium identifier comprising fingerprints for all tracks of the medium content;

searching a database with the medium identifier.

46. A computer-implemented method of searching for medium content information, comprising:

making a presumption that the medium comprises commercial content;

receiving a medium identifier comprising at least two of:

a number of tracks of content on a medium;

a distance calculation for the content on the medium, wherein the distance comprises a numeric representation of a physical property or properties of the medium content; and a track fingerprint for one track on the medium;

searching a database using the medium identifier, wherein the searching of the database comprises searching first for a fingerprint match, followed by searching for a distance match and then searching for a number of tracks match if the search results do not comprise a fingerprint match;

if the search produces at least one match, creating a media list comprising a list of information resulting from the search;

returning the search results; and if the search does not produce at least one match, conducting a non-commercial media test, wherein if the medium content comprises non-commercial content:

extracting fingerprints for all tracks of the medium content from the medium;

creating a medium identifier comprising fingerprints for all tracks of the medium content;

searching a database with the medium identifier.

47. The method of claim 46, wherein an indication is made to the database that the medium identifier information should be added to the database when search results comprise matches for both the distance and the number of tracks when the search results do not comprise a fingerprint match.

48. A computer-implemented method of searching for medium content information, comprising:

making a presumption that the medium comprises commercial content;

receiving a medium identifier comprising at least two of:

a number of tracks of content on a medium;

a distance calculation for the content on the medium; and a track fingerprint for one track on the medium;

searching a database using the medium identifier, wherein the searching of the database comprises searching first for a fingerprint match, followed by searching for a number of tracks match and then searching for a distance match if the search results comprise a fingerprint match;

if the search produces at least one match, creating a media list comprising a list of information resulting from the search;

returning the search results; and if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

49. The method of claim 48, wherein the searching of the database further comprises searching for a similar distance match if the search results do not comprise a distance match.

50. The method of claim 49, wherein an indication is made to the database that the medium identifier information should be added to the database when search results comprise matches for both a similar distance and the number of tracks when the search results also comprise a fingerprint match.

51. A computer readable medium storing instructions which, when executed on a programmed processor, carry out a process comprising:

making a presumption that the medium comprises commercial content;

receiving a medium identifier comprising at least two of:

a number of tracks of content on a medium;

a distance calculation for the content on the medium; and a track fingerprint for one track on the medium;

searching a database using the medium identifier, wherein the searching comprises sequentially searching the database for at least two of the number of tracks, the distance calculation and the track fingerprint in any order;

if the search produces at least one match, creating a media list comprising a list of information resulting from the search;

returning the search results; and if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

52. A computer readable medium storing instructions which, when executed on a programmed processor, carry out a process comprising:

making a presumption that the medium comprises commercial content;

receiving a medium identifier comprising at least two of:

a number of tracks of content on a medium;

a distance calculation for the content on the medium; and a track fingerprint for one track on the medium;

searching a database using the medium identifier;

wherein the searching of the database comprises searching first for a fingerprint match, followed by searching for a distance match and then searching for a number of tracks match if the search results do not comprise a fingerprint match;

if the search produces at least one match, creating a media list comprising a list of information resulting from the search;

returning the search results;

if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

53. A computer readable medium storing instructions which, when executed on a programmed processor, carry out a process comprising:

making a presumption that the medium comprises commercial content;

receiving a medium identifier comprising at least two of:

a number of tracks of content on a medium;

a distance calculation for the content on the medium; and a track fingerprint for one track on the medium;

searching a database using the medium identifier;

if the search produces at least one match, creating a media list comprising a list of information resulting from the search;

making an indication in the database that the medium identifier information should be added to the database when search results comprise matches for both the distance and the number of tracks when the search results do not comprise a fingerprint match;

returning the search results;

if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

54. A computer readable medium storing instructions which, when executed on a programmed processor, carry out a process comprising:

making a presumption that the medium comprises commercial content;

receiving a medium identifier comprising at least two of:

a number of tracks of content on a medium;

a distance calculation for the content on the medium; and a track fingerprint for one track on the medium;

searching a database using the medium identifier;

if the search produces at least one match, creating a media list comprising a list of information resulting from the search;

making an indication in the database that the medium identifier information should be added to the database when search results comprise matches for both the distance and the number of tracks when the search results do not comprise a fingerprint match;

returning the search results; and if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

55. The computer readable medium of claim 54, further storing instructions wherein, when executed on the programmed processor, the process of the searching of the database comprises searching for a similar distance match if the search results do not comprise a distance match.

56. The computer readable medium of claim 55, further storing instructions wherein, when executed on the programmed processor, an indication is made to the database that the medium identifier information should be added to the database when search results comprise matches for both a similar distance and the number of tracks when the search results also comprise a fingerprint match.

57. A computer-implemented method of searching for medium content information, comprising:

receiving a medium identifier comprising:

making a presumption that the medium comprises commercial content;

a number of tracks of content on a medium;

a distance calculation for the content on the medium; and track fingerprints for each track on the medium;

creating a list of track fingerprints;

searching a database using the list of track fingerprints;

if the search produces at least one match, creating a media list comprising a list of information resulting from the search;

returning the search results;

if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

58. The method of claim 57, wherein the search results further comprise naming the medium by artist name if all tracks are by a same artist.

59. The method of claim 57, wherein the search results further comprise naming the medium as "various artists" if not all tracks are by a same artist.

60. A computer readable medium storing instructions which, when executed on a programmed processor, carry out a process comprising:

making a presumption that the medium comprises commercial content;

receiving a medium identifier comprising:

a number of tracks of content on a medium;

a distance calculation for the content on the medium; and track fingerprints for each track on the medium;

creating a list of track fingerprints;

searching a database using the list of track fingerprints;

if the search produces at least one match, creating a media list comprising a list of information resulting from the search;

returning the search results; and if the search does not produce at least one match, conducting a non-commercial media test;

if the medium content comprises non-commercial content:

extracting fingerprints for all tracks of the medium content from the medium;

creating a medium identifier comprising fingerprints for all tracks of the medium content;

searching a database with the medium identifier.

61. The computer readable medium of claim 60, further storing instructions which, when executed on the programmed processor, carry out a process of naming the search results by artist name if all tracks are by a same artist.

62. The computer readable medium of claim 60, further storing instructions which, when executed on the programmed processor, carry out a process of naming the search results as "various artists" if not all tracks are by a same artist.

63. A method of medium content identification, comprising:

verifying that a high-speed communication channel to a remote database exists;

conducting a non-commercial media test;

if the medium is commercial, creating a media identifier comprising at least two of a number of tracks of content on a medium; a distance calculation for the content on the medium; and track fingerprints for each track on the medium;

if the medium is non-commercial:

extracting fingerprints for all tracks of the medium content from the medium;

creating a medium identifier comprising fingerprints for all tracks of the medium content;

searching a local database for content information;

if content information exists in the local database, creating a media list comprising a list of information resulting from the search;

if content information does not exist in the local database, searching the remote database with the medium identifier.

64. The method of claim 63, wherein the medium identifier further comprises one of a distance and a number of tracks on the medium.

65. The method of claim 63, further comprising displaying the search results.

66. The method of claim 63, wherein the high-speed communication channel is a network and the searching in the remote database comprises searching through the network.

67. The method of claim 66, wherein the network comprises at least one of an Internet, a local area network, and a wide area network.

68. A computer readable medium storing instructions which, when executed on a programmed processor, carry out a process of:

conducting a non-commercial media test;

if the medium is commercial, creating a media identifier comprising at least two of a number of tracks of content on a medium; a distance calculation for the content on the medium; and track fingerprints for each track on the medium;

if the medium is non-commercial:

verifying that a high-speed communication channel to a remote database exists;

extracting fingerprints for all tracks of the medium content from the medium;

creating a medium identifier comprising fingerprints for all tracks of the medium content;

if content information exists in the local database, creating a media list comprising a list of information resulting from the search; and if content information does not exist in the local database, searching a remote database with the medium identifier.

* * * * *

UNITED STATES PATENT AND TRADEMARK OFFICE

CERTIFICATE OF CORRECTION

PATENT NO. : 6,973,451 B2
DATED : December 6, 2005
INVENTOR(S) : Laronne et al.

It is certified that error appears in the above-identified patent and that said Letters Patent is hereby corrected as shown below:

Column 2,
Line 22, delete “for,” and insert -- for --.

Column 17,
Line 3, delete “programmable” and insert -- programmed --.

Signed and Sealed this

Fourteenth Day of February, 2006

JON W. DUDAS
*Director of the United States Patent and Trademark Office*